United States Patent [19]
Liu

[11] 4,448,576
[45] May 15, 1984

[54] PASTRY AND DUMPLING MAKER

[76] Inventor: William Y. Liu, 286 Clinton Ave., Brooklyn, N.Y. 11205

[21] Appl. No.: 463,840

[22] Filed: Feb. 4, 1983

[51] Int. Cl.³ .................... A21C 9/06; A21C 11/00
[52] U.S. Cl. ........................................ 425/89; 53/122; 249/112; 249/127; 425/112; 425/116; 425/408; 425/438; 425/441
[58] Field of Search ............... 425/89, 458, 440, 441, 425/438, 408, 110, 112, 116, 117, 118, 121, 126 R, 127; 249/112, 127; 53/122, 526, 527

[56] References Cited

U.S. PATENT DOCUMENTS

| | | | |
|---|---|---|---|
| 2,010,275 | 8/1935 | Rose | 53/527 |
| 2,356,472 | 8/1944 | Rothaug | 53/122 |
| 2,496,609 | 2/1950 | Van Antwerpen | 53/122 |
| 3,271,813 | 9/1966 | Gernandt et al. | 425/116 |
| 3,782,271 | 1/1974 | Tobey et al. | 425/121 |

Primary Examiner—Willard E. Hoag
Attorney, Agent, or Firm—Goodman & Teitelbaum

[57] ABSTRACT

A pastry and dumpling maker for shaping and forming filled pastries, such as dumplings and the like, including a pair of cooperating mold sections which define therebetween a particular pastry shape to be formed. The mold sections are relatively moved into cooperative engagement with each other after the pastry is formed. A flexible strap is suspended above the mold sections and supports a dough skin with a filling placed thereon. As the mold sections are brought into cooperative engagement, a center portion of the flexible strap, together with the dough skin and filling, move downwardly between the mold sections, whereupon the dough skin is folded over the filling and sealed by the mold sections into the particular pastry shape. The shaped pastry is then removable upon separation of the mold sections.

14 Claims, 6 Drawing Figures

PASTRY AND DUMPLING MAKER

BACKGROUND OF THE INVENTION

This invention relates to a food processing device, and more particularly to a device for forming shaped pastries, dumplings and the like.

Various types of pastries and dumpling require specific shapes. For example, one type utilizes a skin dough which encloses a filling. The dough is semicircularly shaped and seals around the filling. Ethnic-type pastries are particularly known for this type of structure. For example, the oriental dumpling is formed in this manner with the skin dough surrounding a chopped meat filling. Likewise, the Jewish pastry "kreplech" has a similar construction.

Although it is well known to use particular shaped molds, such as cookie cutters and the like, for forming particular shapes of pastries, these are generally limited in use. In one type, the pastry is poured into the mold. In another type, the mold cuts directly into the pastry dough. However, when the dough must be folded around a particular filling and then sealed, molds are not used to form this shape, but rather the operation is done manually.

Normally, in making such types of pastries, the dough is cut into sections, the filling is placed into the dough and, by hand, the dough is folded about the filling and then the open edges are sealed together by pressing the maker's fingers into the dough.

As a result, the prior art process requires skilled labor and is time consuming, thus increasing the cost per unit of these types of pastries.

SUMMARY OF THE INVENTION

It is accordingly an object of the present invention to provide a food processing device which can form a filled type of pastry.

A further object of the present invention is to provide a pastry maker which can form and shape particular filled types of pastries, such as dumplings.

Yet another object of the present invention is to provide a pastry maker which can fold a dough skin over a filling and thus seal the open edges of the dough skin around the filling.

Another object of the present invention is to provide a pastry maker for forming filled dumplings and the like, which can be easily utilized, and which will decrease the time of processing and eliminate the use of skilled labor.

Still another object of the present invention is to provide a pastry maker for forming filled dumplings and the like, which only utilizes a single replaceable strip of material in contact with the food, to thereby maintain sanitary conditions in the formulation of these food items.

Briefly, in accordance with the present invention, there is provided a pastry and dumpling maker including a pair of cooperating mold sections which define therebetween the particular form and shape of the filled dumpling being made. The mold sections are mounted on a mechanism which can relatively move the mold sections together into cooperative engagement with each other, and can subsequently separate the mold sections. A flexible strip of material is suspended above the mold sections, and supports a dough skin and a particular filling placed on the dough skin. The flexible strip of material is lowered downwardly between the mold sections as the mold sections are moved into cooperative engagement. Together with the strip of material, the dough skin is positioned between the mold sections to fold over the filling therein, and thus the open edges of the dough skin become sealed as the mold sections engage with each other. The shaped pastry can then be removed upon separation of the mold sections.

In an embodiment of the present invention, the flexible strip of material can be removed and replaced for easy maintenance thereof and to maintain sanitary conditions. The only part of the device that comes in contact with the food is the flexible strip of material, which can be easily cleaned and maintained in a sanitary condition by the removal and repositioning thereof, or by the entire replacement thereof. No other part of the device has any direct contact with the food and, therefore, the device is not contaminated after usage, and can be maintained in a sanitary manner with only minimum effort.

The aforementioned objects, features and advantages of the present invention will, in part, be pointed out with particularity, and will, in part, become obvious from the following more detailed description of the present invention, taken in conjunction with the accompanying drawings, which form an integral part thereof.

BRIEF DESCRIPTION OF THE DRAWINGS

In the drawings.

In the various figures of the drawing, like reference characters designate like parts.

DESCRIPTION OF THE PREFERRED EMBODIMENT

Figure 1:
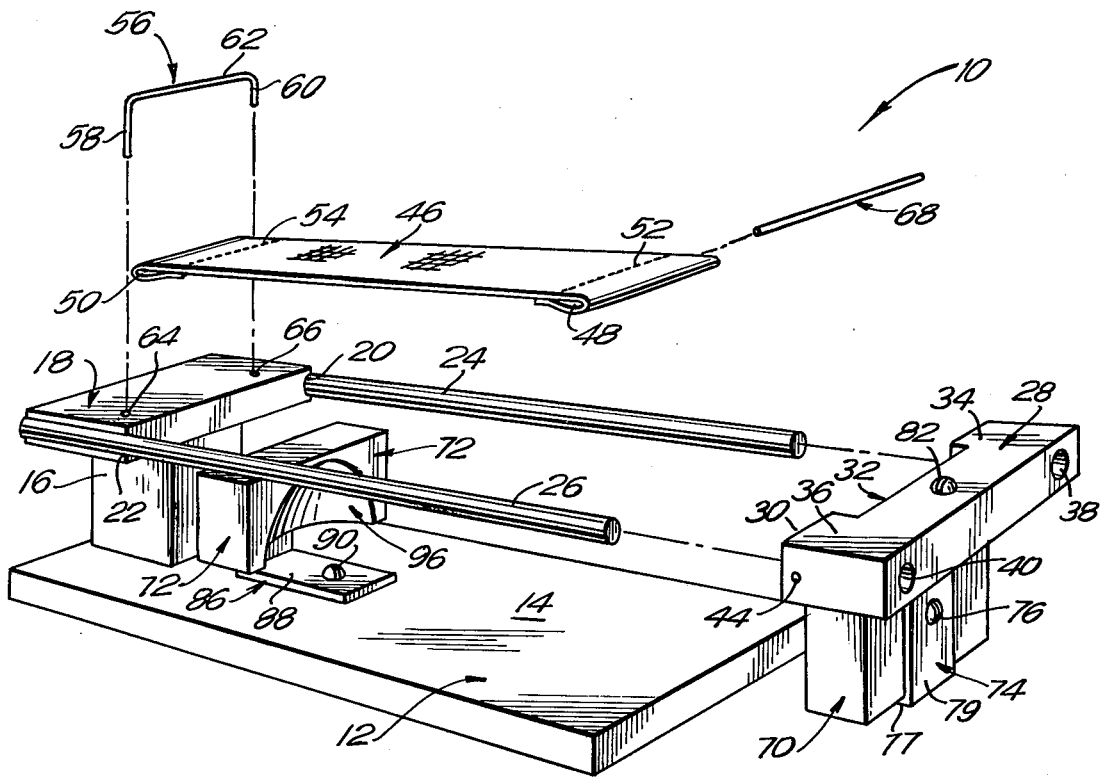
FIG. 1 is an exploded perspective view of the various parts of the pastry and dumpling maker, in accordance with the present invention.

Referring now to the drawings, the pastry and dumpling maker of the present invention is shown generally at 10 and includes a base plate 12 having an upper surface 14, on one end of which is mounted a support block 16. On top of the support block 16 is placed a support platform 18 which extends laterally outwardly from the support block 16 on both sides thereof to provide a T-shaped construction. Semicircular channels 20, 22 are formed into the opposing side edges of the support platform 18. The channels 20, 22 receive elongated guide rails 24, 26 which are secured within the respective channels 20, 22 by means of an adhesive, or the like, the guide rails 24, 26 being cantilevered from the support platform 18.

A yoke 28 is provided in the form of a substantially rectangular block member. A forward face 30 of yoke 28 is positioned towards the support platform 18. A central recess 32 is formed into the forward face 30 and defines, on opposite sides thereof, a pair of opposing leg section 34, 36 laterally extending outwardly from both sides of the yoke member 28 to provide a C-shaped construction. Respective bores 38, 40 are formed completely through the leg section 34, 36, being aligned with the guide rails 24, 26 respectively, so that each bore 38, 40 receives a respective guide rail 24, 26 therethrough. In this way, the yoke member 28 can be positioned on and slide along the cantilevered guide rails 24, 26 which are secured to the support platform 18.

Aligned apertures 42, 44 are respectively formed through the leg sections 34, 36 so as to lie in the same plane as the bores 38, 40, being perpendicular thereto. In this way, the apertures 42, 44 extend through to intersect the bores 38, 40 at the axes thereof.

A flexible strap 46 is provided in the form on an elongated strip of material, preferably fabric. Each end is hemmed over to define respective loops 48, 50. The loops 48, 50 are held in place by means of respective stitching 52, 54 at the hemmed over sections.

Figure 2:
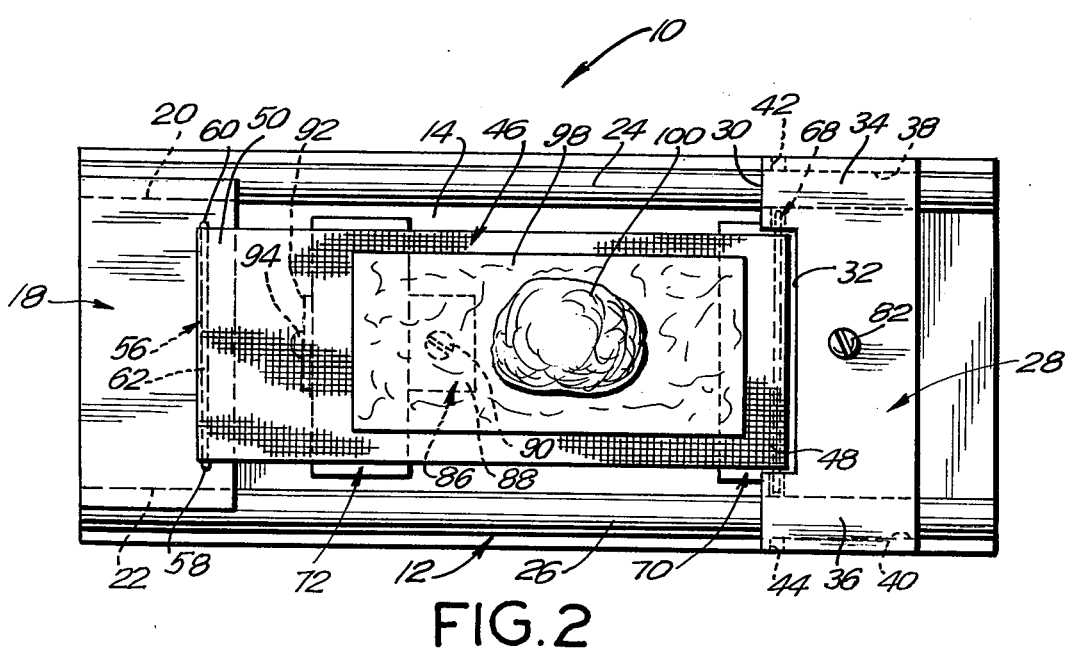
FIG. 2 is a top view of the pastry and dumpling maker, showing a dough skin and filling positioned in place on the flexible strip of material, ready to be shaped and formed.
Figure 3:
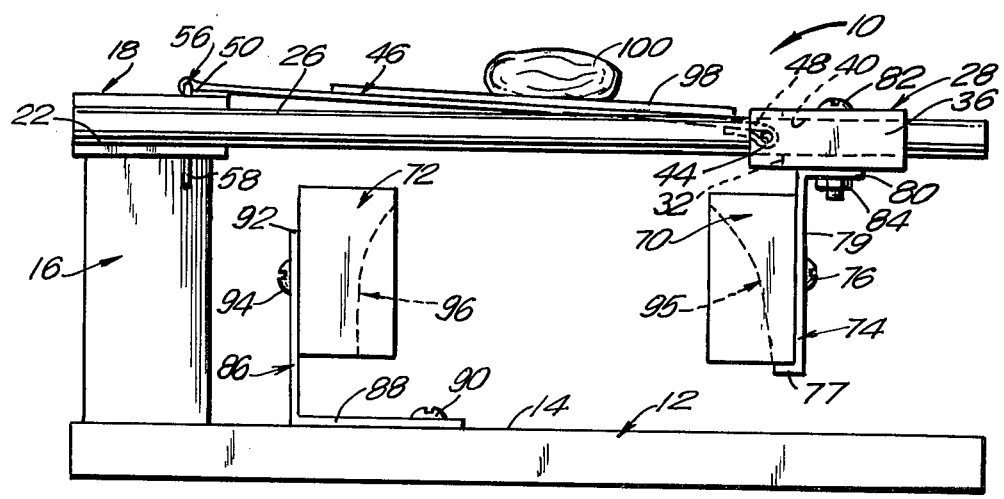
FIG. 3 is a side elevational view similar to that shown in FIG. 3, showing a later stage in the formation of the pastry in which the mold sections are brought together for folding and sealing the dough skin therebetween.
Figure 4:
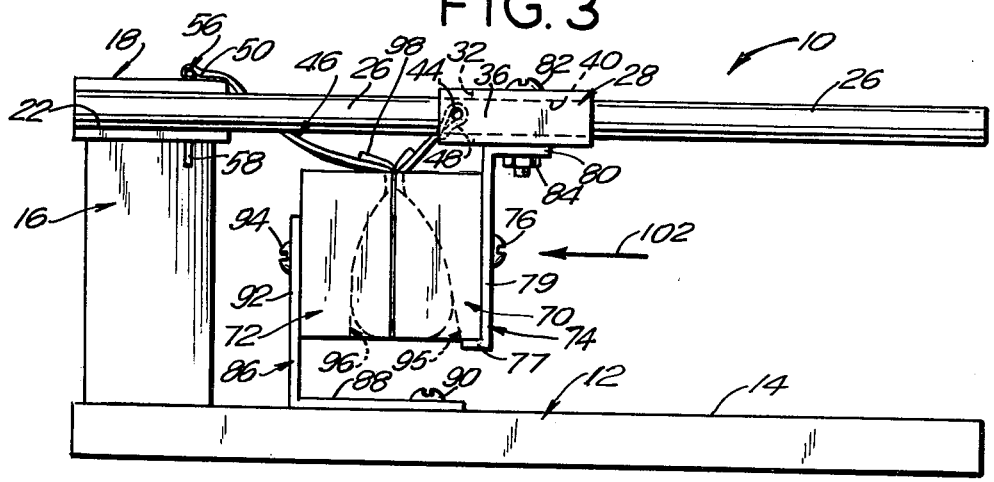
Figure 6:
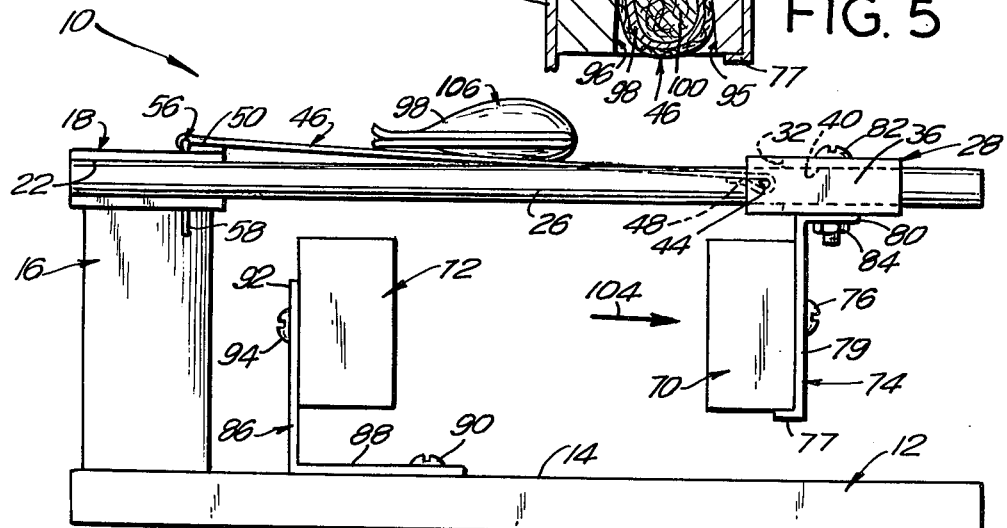
FIG. 6 is a side elevational view similar to that shown in FIG. 3 with the mold sections being separated, showing the completed pastry now available for removal from the flexible strip of material.

The flexible strip of material or strip 46 is retained in place at one end by means of a U-shaped clip 56 having opposing legs 58, 60 interconnected by a bight section 62. The legs 58, 60 are respectfully received in apertures 64, 66 formed through the support platform 18, the apertures 64, 66 being inwardly positioned from the guide rails 26, 24 and laterally outwardly spaced from the support block 16. For convenience of insertion and removal of the clip 56, one leg 58 is made longer than the other leg 60, so that the leg 58 extends beneath the support platform 18, as shown in FIGS. 3, 4 and 6. This construction permits the user to push upward on the longer leg 58 to release the clip 56 from the support platform 18. Likewise, when inserting the clip 56 into the support platform 18, the longer leg 58 can be first inserted into its corresponding receiving aperture 64 to facilitate alignment of the clip 56 and insertion of the other leg 60 into the other aperture 66 of support platform 18. First, however, the bight portion 62 of the clip 56 is passed through the loop 50 of the strap 46 to hold that end of the flexible strip of material 46 secured to the fixed support platform 18, as shown in FIG. 2.

A pin 68 is provided at the other end of the flexible strap 46 and passes through within the loop 48. The pin 68 has a length approximately equal to or slightly less than the spacing between the guide rails 24, 26, as best shown in FIG. 2.

The flexible strap 46 is retained at one end by the U-shaped clip 56 passing through the loop 50 being inserted into the apertures 64, 66 in the support platform 18, and at the other end by means of the pin 68 passing through the loop 48 and being retained within the aligned aperture 42, 44 of the yoke 28. In this manner, the yoke 28 can slide along the guide rails 24, 26 and move toward the support platform 18. As it does so, the center portion of the flexible strap 46 will move downwardly between the guide rails 24, 26. The yoke 28 can then be moved away from the support platform 18, at which time the flexible strap 46 will again resume its raised horizontal position. The limit of movement of the yoke 28 away from the support platform 18 is restricted by the longitudinal extent of the flexible strap 46.

In order to remove the flexible strap 46 to clean it and/or replace it, initially the clip 56 is pulled upwardly out of the support platform 18, in the manner set forth above. This will remove one end of the flexible strap 46. The clip 56 can then be passed through the loop 50 and be entirely removed from that end of the flexible strap 46. Without any restriction, the yoke 28 can then be completely slid off the cantilevered ends of the guide rails 24, 26. While the guide rails 24, 26 were in position within their respective bores 38, 40, the pin 68 was prevented from being removed by means of the blocking position of the guide rails 24, 26, as can best be seen in FIG. 2. However, with the yoke 28 slid off the guide rails 24, 26, the pin 68 can now be extracted through either of the aligned apertures 42, 44, and can be completely removed from the yoke 28. This will free the other end of the strap 46 for cleaning and/or replacement of the strap 46.

After the strap 46 has been cleaned and/or replaced, it is then reinserted by placing it into the recess 32 formed at the front end of the yoke 28. The pin 68 is then passed through the aligned apertures 42, 44 of the yoke 28 so that it passes through the loop 48 of the strap 46, the pin 68 being positioned between the bores 38, 40 of the yoke 28. The yoke 28 is then slid onto the guide rails 26, 24 and moved towards the support platform 18. The U-shaped clip 56 is then placed through the loop 50 of the strap 46, into the receiving apertures 64, 66 in the support platform 18. The opposite ends of the strap 46 are now secured to the device.

Depending from the movable yoke 28 is a mold section 70 for movement therewith, which mates with a corresponding fixed mold section 72. The movable mold section 70 is supported by means of a Z-shaped bracket 74 having a lower leg 77 supporting the bottom of the mold section 70, and interconnecting leg 79 secured into the back of the movable mold section 70 by means of the fastening screw 76, and an upper leg 80 secured to the underside of the yoke 28 by means of a bolt 82 and nut 84 arrangement.

The fixed mold section 72 is held by means of an L-shaped bracket 86 having its lower leg 88 fastened to the upper surface 14 of the base plate 12 by means of a fastening screw 90, and having its other leg 92 secured to the rear of the fixed mold section 72 by means of the fastening screw 94. It should be understood, that the fixed mold section 72 could be secured by other arrangements, such as by extending from the support block 16, or from the support platform 18. Similarly, other modifications could be utilized for retaining the movable mold section 70.

The two mold sections 70, 72 define therebetween a mold cavity having the desired configuration to form the pastry into the shape needed. As shown, each mold section 70, 72 includes a mold cavity 95, 96 open at the bottom thereof, representing a quadrature of an oval shape. As a result, the two mold sections together can configure the pastry into a semi-oval configuration. However, other shapes could be utilized, as is well known.

In operation, a piece of dough skin 98 together with a filling 100 of suitable food ingredients thereon are positioned onto the flexible strap 46. The dough skin 98 is shown as rectangular in shape, however, it could be square, or have other shapes. The filling 100 is typically placed proximately in the mid-section of the dough skin 98, as shown in FIGS. 2 and 3.

The yoke 28 is then moved in the direction of arrow 102, as shown in FIG. 4, so as to approach the support block 16. As it moves, the weight on the flexible strap 46 will force the strap 46 downward between the approaching mold sections 70, 72, and thereby, will fold the dough skin over the filling, as shown in FIGS. 4 and 5.

Figure 5:
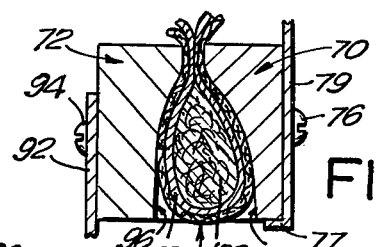
FIG. 5 is a cross sectional view taken through the mold sections shown in FIG. 4, and showing the shaping and forming of the pastries therein.

When the mold sections 70, 72 are brought together, they will cause the dough skin 98 to fold over the filling 100, and at the same time, will seal the top and sides of the dough skin 98 in an oval shape about the filling 100, thereby forming the desired pastry shape within the mold sections, as shown in FIG. 5.

The yoke 28 is then moved in the direction of arrow 104 of FIG. 6, away from the support block 16, thereby straightening out the strap 46 to bring the center portion thereof up above the mold section 70, 72, as shown in FIG. 6. The formed pastry 106 is then positioned on top of the strap 46 and is available for easy removal therefrom. It is understood, that because of the composition of the skin dough, once pressed together, it will retain its adherence, as is common with all skin dough.

It is therefore apparent, that the only part of the present invention that comes in contact with the actual food, is the strap 46 itself. This strap, which can be formed of fabric or other suitable type of material, can be discarded or washed after a desired number of operations to guarantee the sanitation of the food items. Since no other part of the device has any direct contact with the food, the rest of the device is not contaminated after usage, and it can be maintained in a sanitary manner with only minimum effort.

The entire device is mobile and can be easily moved, or it can be permanently fixed by attaching the base plate 12 to a permanent structure. It can be utilized without any skilled labor in that it requires simple movements, being an easy operation. Furthermore, by attaching a suitable motor, the relative movement of the mold sections can be automated to therefore increase mass production and provide possible commercialization on a large scale.

There has been disclosed heretofore the best embodiment of the invention presently contemplated. However, it is to be understood that various changes and modifications may be made thereto without departing from the spirit of the invention.

What is claimed is:

1. A pastry and dumpling maker comprising:
   a pair of cooperating first and second mold sections defining therebetween a particular shape of a pastry to be formed;
   first means for relatively moving said mold sections into cooperative engagement with each other to form the pastry, and for subsequently separating said mold sections after a shaped pastry is formed;
   a flexible strip of material defining a strap for supporting a dough skin with a filling of food ingredients thereon;
   second means for suspending said flexible strap above said mold sections, and for lowering a center portion of said flexible strap with the dough skin and filling supported thereon between said mold sections as said mold sections are moved into cooperative engagement, whereby the dough skin is folded over the filling and sealed into the particular pastry shape, the shaped pastry being removable upon separation of said mold sections.

2. A pastry and dumpling maker as in claim 1, and comprising means for removing said flexible strap from said suspending second means, whereby said flexible strap can be replaced.

3. A pastry and dumpling maker as in claim 1, wherein said mold sections define a cavity therebetween having an open bottom.

4. A pastry and dumpling maker as in claim 3, wherein said cavity has a semi-oval configuration.

5. A pastry and dumpling maker as in claim 1, wherein said first means for moving includes retaining means for fixedly retaining said first mold section, and operating means for moving said second mold section relative to said first mold section.

6. A pastry and dumpling maker as in claim 5, wherein said operating means includes support means, guide rails supported by said support means and yoke means slidable along said guide rails, said yoke means supporting said second mold section, said retaining means retaining said first mold section along a sliding path of said yoke means.

7. A pastry and dumpling maker as in claim 6, and comprising a base plate, said support means being upstanding from said base plate, said first mold section being retained by said retaining means above said base plate, and said second mold section depending from said yoke means and being confrontingly aligned with said first mold section.

8. A pastry and dumpling maker as in claim 7, wherein said flexible strap is a length of fabric material.

9. A pastry and dumpling maker as in claim 6, wherein said second means for suspending includes first engagement means for coupling one end of said strap to said support means and second engagement means for coupling an opposite end of said strap to said yoke means, whereby a center portion of said strap moves downwardly between said mold section as said yoke means slides towards said first mold section.

10. A pastry and dumpling maker as in claim 9, wherein said support means includes a fixed support platform, said guide rails being cantilevered outwardly from said support platform, a sliding limit of said yoke along said guide rails being limited by a longitudinal extent of said strap during operation of said pastry and dumpling maker.

11. A pastry and dumpling maker as in claim 10, wherein said first and second engagement means are respectively removable from said support platform and said yoke means.

12. A pastry and dumpling maker as in claim 11, wherein said first engagement means includes a U-shaped clip having a pair of legs interconnected by a bight portion, said support platform containing a pair of spaced apertures for removably receiving said legs of said clip, and a loop provided at said one end of said strap for removably receiving said bight portion of said clip therethrough.

13. A pastry and dumpling maker as in claim 7, including a recess provided in said yoke means for receiving said strap therein and defining a pair of side leg sections on opposite sides of said yoke means, bores extending through said side leg sections coaxial with said guide rails for receiving said guide rails therethrough, aligned apertures provided through said side leg sections coplanar with and perpendicular to said bores, said aligned apertures communicating with said bores, a pin received in said aligned apertures and extending between said guide rails, and a loop provided at said opposite end of said strap for receiving said pin therethrough, whereby said pin is retained in place by said guide rails when said yoke means is mounted on said guide rails, and said strap is removed by removing said U-shaped clip from said support platform, sliding said yoke means off said guide rails, and removing said pin from said aligned apertures.

14. A pastry and dumpling maker as in claim 12, wherein one leg of said U-shaped clip is shorter than the other leg.

* * * * *